(12) United States Patent
Shinkai et al.

(10) Patent No.: US 8,046,341 B2
(45) Date of Patent: *Oct. 25, 2011

(54) INFORMATION PROCESSING APPARATUS FOR REPRODUCING METADATA AND METHOD, PROGRAM, AND RECORDING MEDIUM

(75) Inventors: Mitsutoshi Shinkai, Kanagawa (JP); Yoshiaki Shibata, Kanagawa (JP)

(73) Assignee: Sony Corporation, Tokyo (JP)

( * ) Notice: Subject to any disclaimer, the term of this patent is extended or adjusted under 35 U.S.C. 154(b) by 479 days.

This patent is subject to a terminal disclaimer.

(21) Appl. No.: 10/875,935

(22) Filed: Jun. 24, 2004

(65) Prior Publication Data

US 2004/0267819 A1    Dec. 30, 2004

(30) Foreign Application Priority Data

Jun. 26, 2003 (JP) ................. P2003-182000

(51) Int. Cl.
G06F 7/00 (2006.01)
(52) U.S. Cl. ........................ 707/695; 707/913
(58) Field of Classification Search .............. 707/1, 3, 707/104.1, 200; 715/513, 723, 733, 516; 709/229, 231, 263; 375/240; 369/59.25; 386/4, 46, 52, 69, 95, 111; 725/93; 345/838
See application file for complete search history.

(56) References Cited

U.S. PATENT DOCUMENTS

| | | | | |
|---|---|---|---|---|
| 5,831,954 A * | 11/1998 | Sako et al. | ............. | 369/59.25 |
| 5,956,716 A * | 9/1999 | Kenner et al. | ............. | 707/10 |
| 6,473,096 B1 * | 10/2002 | Kobayashi et al. | ............. | 715/731 |
| 6,522,344 B1 * | 2/2003 | Wakamatsu et al. | ............. | 715/749 |
| 6,886,034 B2 * | 4/2005 | Blumberg | ............. | 709/217 |
| 6,925,474 B2 * | 8/2005 | McGrath et al. | ............. | 707/770 |
| 6,929,625 B2 * | 8/2005 | Bierman | ............. | 604/174 |
| 6,938,269 B2 * | 8/2005 | Kajimoto | ............. | 725/93 |
| 6,993,196 B2 * | 1/2006 | Sun et al. | ............. | 382/233 |
| 7,068,918 B1 * | 6/2006 | Chung et al. | ............. | 386/95 |
| 7,076,558 B1 * | 7/2006 | Dunn | ............. | 709/229 |
| 7,111,233 B1 * | 9/2006 | Ballantyne et al. | ............. | 715/516 |
| 7,123,816 B2 * | 10/2006 | McGrath et al. | ............. | 386/95 |
| 7,130,842 B2 * | 10/2006 | Lynch et al. | ............. | 707/3 |
| 7,219,330 B2 * | 5/2007 | Hogg et al. | ............. | 717/106 |
| 7,295,752 B1 * | 11/2007 | Jain et al. | ............. | 386/46 |
| 2001/0033295 A1 * | 10/2001 | Phillips | ............. | 345/723 |

(Continued)

FOREIGN PATENT DOCUMENTS

WO    WO 02 05089    1/2002

OTHER PUBLICATIONS

Nack et al., Everything You Wanted to Know About MPEG-7: Part 1, Jul.-Sep. 1999, IEEE, vol. 6, Issue 3, pp. 65-77.*

(Continued)

Primary Examiner — Wilson Lee
Assistant Examiner — Jessica N Le
(74) Attorney, Agent, or Firm — Frommer Lawrence & Haug LLP; William S. Frommer; Thomas F. Presson

(57) ABSTRACT

A system and method to protect uniquely extended metadata by others, while maintaining compatibility of metadata. An information processing apparatus determines if items included in entered metadata are defined in advance, and reproduces only items that are included in the metadata and determined as defined in advance, and rewrites or transfers the entered metadata when the metadata is rewritten or transferred.

7 Claims, 13 Drawing Sheets

U.S. PATENT DOCUMENTS

| | | | |
|---|---|---|---|
| 2002/0006265 A1* | 1/2002 | Beyrouti | 386/46 |
| 2002/0107973 A1* | 8/2002 | Lennon et al. | 709/231 |
| 2002/0116392 A1* | 8/2002 | McGrath et al. | 707/104.1 |
| 2002/0131764 A1* | 9/2002 | David et al. | 386/69 |
| 2002/0133487 A1* | 9/2002 | Oshins et al. | 707/5 |
| 2002/0136531 A1* | 9/2002 | Harradine et al. | 386/69 |
| 2002/0146232 A1* | 10/2002 | Harradine et al. | 386/46 |
| 2002/0164149 A1* | 11/2002 | Wilkinson | 386/46 |
| 2002/0191957 A1* | 12/2002 | Ito | 386/52 |
| 2003/0018607 A1* | 1/2003 | Lennon et al. | 707/1 |
| 2003/0031260 A1* | 2/2003 | Tabatabai et al. | 375/240.25 |
| 2003/0085997 A1* | 5/2003 | Takagi et al. | 348/143 |
| 2003/0091329 A1* | 5/2003 | Nakata et al. | 386/52 |
| 2003/0115219 A1* | 6/2003 | Chadwick | 707/200 |
| 2003/0206721 A1* | 11/2003 | Gotoh et al. | 386/95 |
| 2003/0225753 A1* | 12/2003 | Balassanian et al. | 707/3 |
| 2004/0024818 A1* | 2/2004 | Yoon et al. | 709/204 |
| 2004/0024898 A1* | 2/2004 | Wan | 709/231 |
| 2004/0044680 A1* | 3/2004 | Thorpe et al. | 707/102 |
| 2004/0111728 A1* | 6/2004 | Schwalm | 719/316 |
| 2004/0205470 A1* | 10/2004 | Jones et al. | 715/500 |
| 2004/0205546 A1* | 10/2004 | Blumberg | 715/512 |
| 2004/0218902 A1* | 11/2004 | Yanagita | 386/52 |
| 2004/0221322 A1* | 11/2004 | Shen et al. | 725/135 |
| 2005/0114882 A1* | 5/2005 | Sakamaki et al. | 725/29 |
| 2006/0020602 A9* | 1/2006 | Morgan et al. | 707/100 |
| 2006/0031757 A9* | 2/2006 | Vincent, III | 715/513 |
| 2006/0120239 A1* | 6/2006 | Shinkai et al. | 369/47.15 |
| 2006/0126451 A1* | 6/2006 | Shinkai et al. | 369/30.3 |
| 2007/0192697 A1* | 8/2007 | Kawamura et al. | 715/716 |
| 2008/0052325 A1* | 2/2008 | Vincent, III | 707/203 |

OTHER PUBLICATIONS

Hunter J., An Overview of the MPEG-7 Description Definition Language (DDL), Jun. 2001, IEEE, vol. 11, Issue 6, pp. 765-772.*

Hunter J., An Application Profile which combines Dublin Core and MPEG-7 Metadata Terms for Simple Video Description, Feb. 12, 2002, www.metadata.net/harmony/video_appln_profile.html/, pp. 1-10.*

Holly, "Primary Graphics", Extensible Markup Language, 1998.

Mitsuaki Tsunakawa, Ryoji Kataoka, Masashi Morimoto, Framework supporting metadata service, NTT technical journal, Japan, Corporate judicial person Electrical communication Association, Apr. 1, 2003, vol. 15, No. 4, p. 17-20.

* cited by examiner

<RealTimeMeta xmlns="urn:schemas-proDisc:realTimeMeta" ... >
  <TargetMaterial>060A...</TargetMaterial>
  <Filler>00...</Filler>

<Frame>
    <NextByteBoundary>0</NextByteBoundary>
    <Ltc>...</Ltc>
    <Umid>...</Umid>
    <Klv>...</Klv>
    <Filler>000000000...</Filler>
  </Frame>
  <Frame>
    <NextByteBoundary>0</NextByteBoundary>
    <Ltc>...</Ltc>
    <Umid>...</Umid>
    <Klv>...</Klv>
    <Filler>000000000...</Filler>
  </Frame>
    :
</RealTimeMeta>
```

Wrapper

REQUIRED ITEM

FIG. 8

```
<RealTimeMeta xmlns="urn:schemas-proDisc:realTimeMeta:cameraMeta" ... >     1
  <TargetMaterial>060A...</TargetMaterial>                                   2
  <Filler>00...</Filler>                                                     3

<Frame>                                                                    4
    <NextByteBoundary>0</NextByteBoundary>                                   5
    <Ltc>...</Ltc>                                                           6
    <Umid>...</Umid>                                                         7
    <Klv>...</Klv>                                                           8
    <IrisF value="170"/>                                                     9
    <LensExtender value="3"/>                                               10
    <Zoom value="170"/>                                                     11
    <Focus value="170"/>                                                    12
    <ColorProperty>                                                         13
      <Red integral="2730" peak="2730"/>                                    14
      <Green integral="2730" peak="2730"/>                                  15
      <Blue integral="2730" peak="2730"/>                                   16
    </ColorProperty>                                                        17
    <Filler>000000000...</Filler>                                           18
  </Frame>                                                                  19

:</RealTimeMeta>
```

Wrapper: lines 1–3
REQUIRED ITEM: lines 4–8
UNIQUE ITEM: lines 9–19

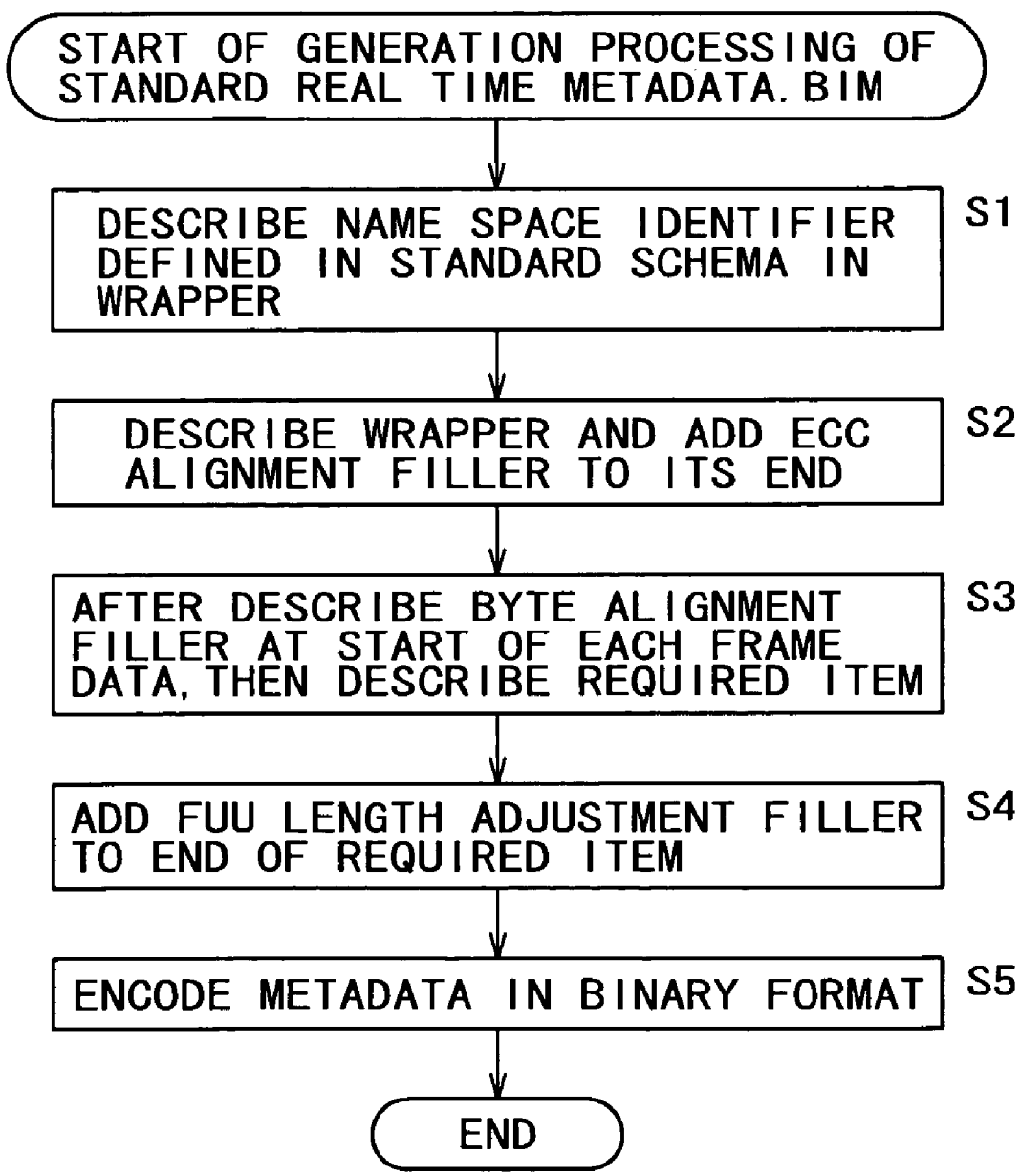

… # INFORMATION PROCESSING APPARATUS FOR REPRODUCING METADATA AND METHOD, PROGRAM, AND RECORDING MEDIUM

CROSS REFERENCE TO RELATED APPLICATION

This application claims priority from Japanese Priority Document No. 2003-182000, filed on Jun. 26, 2003 with the Japanese Patent Office, which document is hereby incorporated by reference.

BACKGROUND OF THE INVENTION

1. Field of the Invention

The present invention relates to an information processing apparatus and method, a program, and a recording medium, and more particularly to an information processing apparatus and method, a program, and a recording medium that allow the user to search for or edit data such as a video, more easily.

2. Description of the Related Art

Recently, more and more metadata, in which information on filmed video material data (hereinafter also called as material data) is described, is used in the production field of video work such as a TV program and video contents. Such metadata refers to data used to search for or edit material data.

To effectively utilize such metadata, it is necessary for the metadata to have compatibility among a plurality of apparatuses used in the production of a video work so that a video signal reproducing apparatus such as an editing apparatus can use metadata generated by a video signal recording apparatus such as a video camera.

To achieve this, the metadata description format has been standardized to ensure the consistency of the description format and the meaning of metadata. For example, in MPEG (Moving Picture Experts Group) 7, more versatile XML (extensible Markup Language) is used for describing metadata to standardize the format of metadata.

However, in spite of an effort to standardize metadata, the concept and the object differ, in practice, among manufacturers that manufacture and sell video signal recording apparatuses and video signal reproducing apparatuses, and therefore, there is a possibility that manufacturers uniquely extend and describe metadata.

Although metadata maybe uniquely extended by each manufacturer in MPEG 7 as described above, the definition of metadata extended by some manufacturer is not regulated. Therefore, the problem is that metadata including the contents extended by some manufacturer is deleted or changed by the apparatus of some other manufacturer that does not know the extension.

SUMMARY OF THE INVENTION

In view of this situation, the present invention is provided to protect uniquely extended metadata by others, while maintaining compatibility of metadata.

An information processing apparatus according to the present invention is characterized by comprising determination means for determining if items included in entered metadata are defined in advance, reproducing means for reproducing only items that are included in the metadata and determined as defined in advance by the determination means, and control means for rewriting or transferring the entered metadata when the metadata is rewritten or transferred.

The metadata can be described using XML.

The determination means can determine if an item included in the metadata is defined in advance based on whether or not a name space identifier described in the metadata is defined in a schema owned by the information processing apparatus.

The metadata may be made to be non-real-time metadata that is not always required to be read at the same time with the reproduction of the material data.

An information processing method according to the present invention is characterized by comprising a determination step for determining if items included in entered metadata are defined in advance, a reproducing step for reproducing only items that are included in the metadata and determined as defined in advance by the processing of the determination step, and a control step for rewriting or transferring the entered metadata when the metadata is rewritten or transferred.

A program according to the present invention is characterized by causing a computer to execute processing comprising a determination step for determining if items included in entered metadata are defined in advance, a reproducing step for reproducing only items that are included in the metadata and determined as defined in advance by the processing of the determination step, and a control step for rewriting or transferring the entered metadata when the metadata is rewritten or transferred.

A program recorded on a recording medium according to the present invention is characterized by comprising a determination step for determining if items included in entered metadata are defined in advance, a reproducing step for reproducing only items that are included in the metadata and determined as defined in advance by the processing of the determination step, and a control step for rewriting or transferring the entered metadata when the metadata is rewritten or transferred.

According to the information processing apparatus, method, and program according to the present invention, only the items included in the entered metadata and determined as defined in advance are reproduced. When the entered metadata is rewritten or transferred, the metadata is rewritten or transferred.

Some embodiments of the present invention will be described below. The correspondence between the constituent features described in the claims and the examples of the embodiments of the invention is exemplified as follows. This description is to confirm that the examples supporting the invention described in the claims are described in the embodiments. Therefore, even if there is an example that is described in the embodiments of the invention but is not described here as the one corresponding to a constituent feature, that does not mean that the example does not correspond to the constituent feature. Conversely, even if an example is described here as the one corresponding to a constituent feature, that does not mean that the example does not correspond to a constituent feature other than the constituent feature.

In addition, this description does not mean that the inventions corresponding to the examples described in the embodiments of the invention are all included in the claims. In other words, this description does not deny that there is an invention that corresponds to an example described in the embodiments of the invention and but is not described in the claims of this application, that is, does not deny there is an invention that will be applied as a divisional application or added as an amendment in future The correspondence between the constituent features, which are claimed in the claims of the program according to the present invention and the program recorded on the recording medium according to the present invention, and the examples in the embodiments of the invention is the same as that of the information processing method of the present invention described above and therefore its description is omitted.

As described above, the present invention allows the user to easily search for and edit data such as videos.

In addition, the present invention can protect metadata uniquely extended by others while maintaining metadata compatibility.

BRIEF DESCRIPTION OF THE DRAWINGS

FIG. 7 is a diagram showing an example of standard XML-coded real time metadata before being encoded into BiM;

FIG. 8 is a diagram showing an example of non-standard XML-coded real time metadata before being encoded into BiM;

FIG. 9 is a flowchart showing processing for describing standard real time metadata before being encoded into BiM;

DESCRIPTION OF THE PREFERRED EMBODIMENTS

Preferred embodiments of the present invention will be described below with reference to the drawings.

Figure 1:
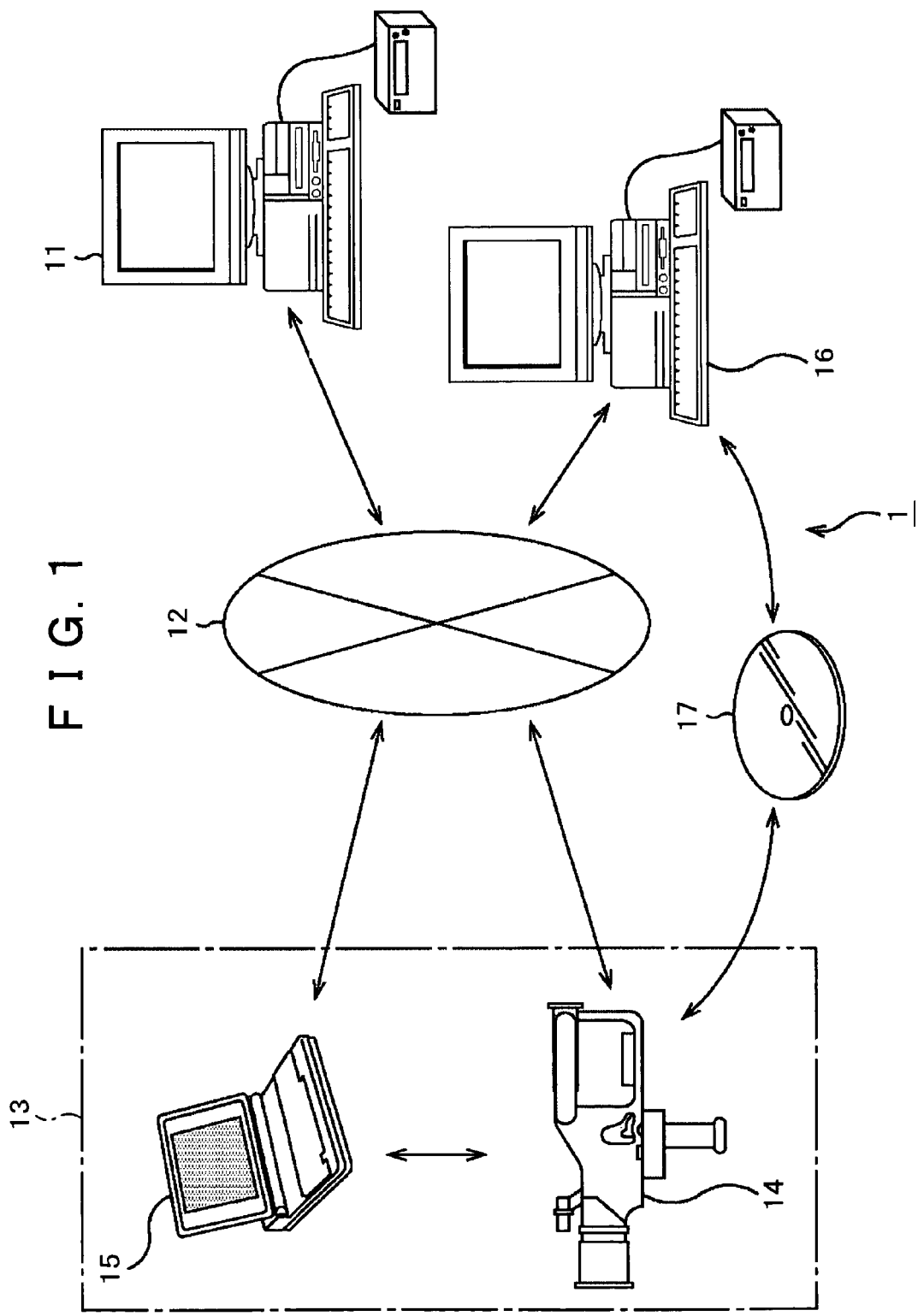
FIG. 1 is a diagram showing an example of the configuration of a video program production support system to which the present invention is applied.

FIG. 1 shows an example of the configuration of a video program production support system to which the present invention is applied. This video program production support system 1 is such a system, for example, used in a television broadcast station that broadcasts television signals, or a video content production company that produces video contents such as a video or a movie, and also is such a system that produces video programs such as television programs or video work such as movies. The video program production support system 1 is designed to allow a plurality of departments which shares the production of a video program, to consistently use metadata configured in the electronic file format and added to the video program, and is a system for creating a video program efficiently.

The video program production support system 1 comprises a planning terminal apparatus 11 for planning a video program, a network 12 to which the planning terminal apparatus 11 is connected, a news gathering terminal apparatus 13 connected to the network 12, an imaging apparatus 14 and a field PC/PDA (Personal Computer/Personal Digital Assistants) 15 (hereinafter called a field PC 15) that constitute the news gathering terminal apparatus 13, an editing terminal apparatus 16 also connected to the network 12, and an optical disc 17 that is a recording medium.

The planning terminal apparatus 11 composed, for example, of an information processing apparatus such as a personal computer and its peripherals is installed in a plan managing department responsible for planning a video program. This plan managing department, which is a department responsible for the general management of video program production, plans and develops an idea for a video program to be produced, creates the scenario (outline) of the video program and, at the same time, gives production work content instructions to other department such as the news gathering department and the editing department that will be described later.

For example, the planning terminal apparatus 11 creates configuration table metadata in the electronic file format, including production instruction information corresponding to the scenario of a video program, for each video program. The planning terminal apparatus 11 supplies the created configuration table metadata to the news gathering terminal apparatus 13 and so on via the network 12. In response, the plan managing department gives the news gathering department an instruction about the scenes and the contents to be gathered or filmed.

The news gathering terminal apparatus 13, a group of terminal apparatuses to be used by the news gathering department that gathers news, is composed of the imaging apparatus 14 and the field PC 15. This news gathering department, which is, for example, a department that actually gathers news in a production site according to a production instruction or a scenario from the plan managing department, films the video of the scenes constituting a video program and, at the same time, gathers the news about the situation the scenes are filmed.

The imaging apparatus 14 composed of a video camera such as Camcorder (registered trade mark) is an apparatus used for gathering the news of a broadcast news program and for filming the video contents of a sport game and a movie. This imaging apparatus 14 is connected to the network 12, and obtains configuration table metadata, for example, from the planning terminal apparatus 11 via the network 12. The imaging apparatus 14 displays thus obtained configuration table metadata on a predetermined display unit so that a filming staff such as a cameraman is able to confirm the contents to be filmed. The imaging apparatus 14 is operated by the filming staff to film the scenes constituting a video program based on the production instruction information included in the obtained configuration table metadata. The imaging apparatus 14 records the image data and the audio data obtained through filming onto a recording medium such as the optical disc 17.

The imaging apparatus 14 can record not only original image data that is, for example, image data obtained through imaging but also low resolution image data (hereinafter called low resolution data) onto the optical disc 17. The original image data has large data amount, but is high quality image data used for the finished product of a video program. On the other hand, the low resolution data generated by reducing the number of pixels of each frame of the original image data is the image data corresponding to the image of a frame having a smaller number of pixels. In addition, the low resolution data may also be encoded, for example, in the MPEG4 format. This low resolution data, though it is lower in image quality as compared with that of the original image data, is small in the data amount. Therefore, the load of the transmission and reproducing processing is low and is used primarily for coarse editing.

The optical disc 17 on which image data and audio data are written by the imaging apparatus 14 is transported to, and used in the editing department or the field PC 15 which will be described later. However, because the transportation of the optical disc 17 requires some amount of time, the imaging apparatus 14 may be configured to be able to supply the video contents to the planning terminal apparatus 11, field PC 15, or editing terminal apparatus 16 via the network 12. In this case, to reduce the transfer time (to reduce the load of the transfer processing), it is desirable for the imaging apparatus 14 to supply the low resolution data having a smaller data amount corresponding to the image data, instead of the image data having a larger data amount obtained through imaging.

The transfer processing of the low resolution data by the imaging apparatus 14 may be performed in any timing, that is, it may be performed in parallel with the imaging processing or at a time after the termination of the imaging processing.

Transferring the low resolution data in this way allows the editing department to start the editing work in an earlier stage (for example, in parallel with the imaging processing) before the transportation of the optical disc 17 even if the transported optical disc 17 does not yet arrive, thus increasing the production efficiency of a video program. When the low resolution data is transmitted via the network 12 as described above, the imaging apparatus 14 may also record only the original image data and audio data onto the optical disc 17 (without writing low resolution data on the optical disc 17).

The recording media on which the imaging apparatus 14 records video contents is not limited to the optical disc 17 shown in the example but may be any recording medium. For example, the recording medium may be a magnetic disk including a flexible disk, a magnetic tape used for a DV (Digital Video) or a VHS (Video Home System), or a semiconductor memory including a flash memory.

The field PC 15 is configured, for example, of a portable information processing apparatus such as a notebook personal computer or a PDA, and its peripherals. The field PC 15 connected to the imaging apparatus 14 through various wired or wireless transmission lines can share the configuration table metadata, the video contents, and soon with the imaging apparatus 14.

The field PC 15 obtains the configuration table metadata from the planning terminal apparatus 11 or the configuration table metadata from the imaging apparatus 14 via the network 12. The field PC 15 displays the obtained configuration table metadata on a predetermined display unit for a person in the news gathering department to confirm the contents to be collected or filmed.

In addition, the field PC 15 generates filming situation information, which is information on the new-gathering and filming situation, based on an input from a user who is a news gathering department person in charge and adds the generated filming situation information to the remarks column of the configuration table metadata. This filming situation information, for example, text data describing each take or news-gathering site from various viewpoints, is information useful for the editing processing that will be described later. In this way, the field PC 15 edits the configuration table metadata by writing the filming situation information. The field PC 15 also supplies the filming situation information to the imaging apparatus 14 as the metadata to add the metadata to the image data or the audio data obtained by the imaging apparatus 14.

The editing terminal apparatus 16 composed, for example, of an information processing apparatus such as a personal computer and its peripherals is installed in the editing department where video contents are edited. The editing department edits the image data and the audio data obtained by the imaging apparatus 14 based on a production instruction or a scenario from the plan managing department or on the configuration table metadata reflecting the news-gathering situation in the news gathering department, and completes the video program.

The editing terminal apparatus 16 obtains the updated configuration table metadata or the low resolution data from the imaging apparatus 14 via the network 12. The editing terminal apparatus 16 also reproduces the original image data or audio data from the optical disc 17 on which the image data or the audio data are written by the imaging apparatus 14. In addition, the editing terminal apparatus 16 can obtain a production instruction directly from the planning terminal apparatus 11 via the network 12.

The editing terminal apparatus 16 advantageously reproduces and displays the obtained video content data based on the configuration table metadata obtained as described above. For example, the editing terminal apparatus 16 is operated by the user to continuously displays the low resolution data, obtained via the network 12, and the original image data and audio data, recorded on the optical disc 17, according to the sequence described in the scenario or to display only the image data of a desired clip. When the original image data written on the optical disc 17 is reproduced, the editing terminal apparatus 16 uses a disk apparatus that is a read/write apparatus that reads data from the optical disc 17 or writes data on the optical disc 17.

The editing terminal apparatus 16 not only reproduces and displays the required image data in a preferred sequence based on the configuration table metadata, but also edits the image data obtained as a result of news gathering. This editing processing includes coarse editing processing and actual editing processing.

Coarse editing processing is simple editing processing for image data and audio data. For example, during the coarse editing, when the editing terminal apparatus 16 obtains multiple units of data (hereinafter called clip data) corresponding to a clip, which is a unit indicating one imaging processing, and concerning a video content including image data and audio data, the editing terminal apparatus 16 selects clip data to be used for actual editing from the clip data, selects a necessary video portion from the selected clip data (Logging), sets the edit start position (Edit-In point) and the edit end position (Edit-Out point) corresponding to the selected video portion using, for example, a time code, and extracts (Ingesting) the corresponding portion from the clip data described above.

A clip is a unit indicating not only one imaging processing but also a unit indicating the time from the start to the end of the imaging processing, a unit indicating the length of various data obtained through the imaging processing, and a unit indicating the data amount of various data obtained through the imaging processing. In addition, a clip sometimes indicates the aggregate of the various data.

Actual editing processing refers to processing that assembles each clip data for which coarse editing processing is performed, performs final image adjustment to the image data, and creates a finished package data that is the data used for broadcasting in a program.

Each of the planning terminal apparatus 11, imaging apparatus 14, field PC 15, and editing terminal apparatus 16 described above may be configured by a plurality of apparatuses. For example, image data obtained by a plurality of imaging apparatuses 14 may be obtained by one editing terminal apparatus 16 via the optical disc 17 or the network 12 for performing editing processing for the data. Also, the data supplied by one imaging apparatus 14 may be edited by a plurality of editing terminal apparatuses 16.

Conversely, although each of the planning terminal apparatus 11, imaging apparatus 14, field PC 15, and editing terminal apparatus 16 described above is an independent apparatus in the above description, the embodiment is not limited to this configuration, instead, a part or the whole of the functions of the apparatuses may be integrated.

In addition to the planning terminal apparatus 11, imaging apparatus 14, field PC 15, and editing terminal apparatus 16 described above, a center server (not shown) connected to the network 12 may be provided in the video program production support system 1 to configure a client/server system where the planning terminal apparatus 11, imaging apparatus 14, field PC 15, and editing terminal apparatus 16 are clients.

Figure 2:
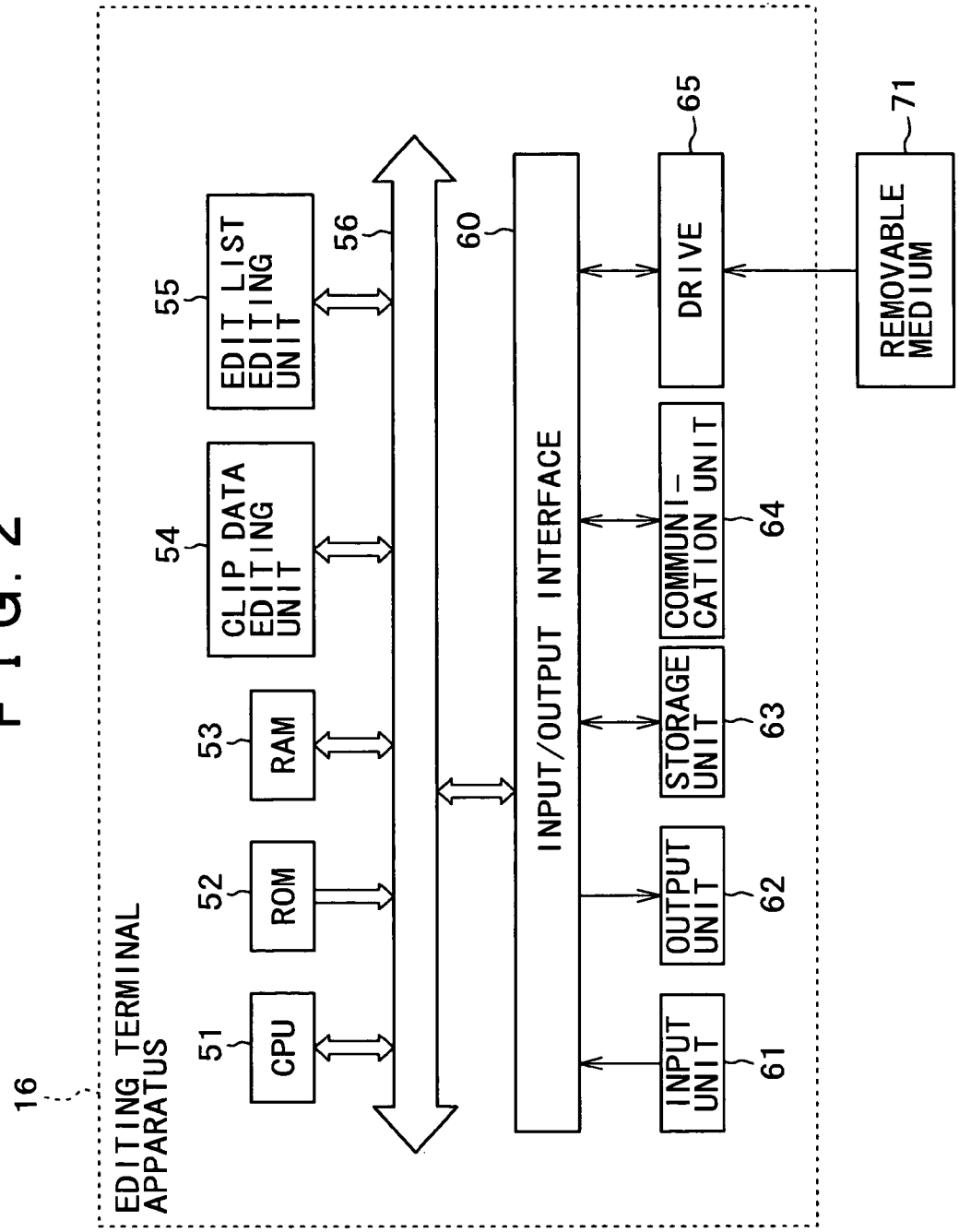
FIG. 2 is a block diagram showing an example of the internal configuration of an editing terminal apparatus in FIG. 1.

FIG. 2 shows an example of the detailed configuration of the editing terminal apparatus 16 in FIG. 1. A CPU (Central Processing Unit) 51 of the editing terminal apparatus 16 executes various processing according to a program stored in a ROM (Read Only Memory) 52. In a RAM (Random Access Memory) 53, data and programs required by the CPU 51 to execute various processing are stored as necessary.

A clip data editing unit 54 controls an output unit 62 and causes it to display the GUI (Graphical User Interface) and so forth on the display, performs editing processing for image data, audio data, low resolution data, or metadata written on the optical disc 17 as a removable medium 71 installed on a drive 65 or low resolution data obtained via a communication unit 64 based on an operation input from the user accepted by an input unit 61, generates information on editing contents or information on edited data, and supplies the generated information to an edit list editing unit 55. The clip data editing unit 54 performs non-destructive editing processing without updating various data to be edited.

The edit list editing unit 55 generates an edit list, which is information on the editing result, based on various information generated as a result of editing processing performed in the clip data editing unit 54, and stores the generated edit list in a storage unit 63. At this time, the edit list editing unit 55 generates the clip metadata for the edit list, which is the clip metadata for the edit list, based on the clip metadata that is metadata on the clip to be edited and that need not be processed in real time, as will be described later. For example, the edit list editing unit 55 generates the conversion table of the non-continuous points of LTC (Linear Time Code) corresponding to the image data of an edited clip and the frame numbers based on the conversion table included in the clip metadata on the clip to be edited and records the data as the edit list clip metadata.

The CPU 51, ROM 52, RAM 53, clip data editing unit 54, and edit list editing unit 55 are interconnected via a bus 56. An input/output interface 60 is also connected to this bus 56.

The input unit 61 including a keyboard and a mouse is connected to the input/output interface 60, and the signal input to the input unit 61 is outputted to the CPU 51. The output unit 62 including a display and a speaker is also connected to the input/output interface 60.

The storage unit 63 including a hard disk, an EEPROM (Electronically Erasable and Programmable Read Only Memory), and so on, and the communication unit 64 communicating data with other apparatuses via the network 12 are also connected to the input/output interface 60. The drive 65 is used to read data from, or write data to, the removable medium 71 that is a recording medium such as a magnetic disk, an optical disc, a magneto optical disk, and a semiconductor memory.

Next, the optical disc 17 used by the editing terminal apparatus 16 during editing processing and an example of the configuration of data written on the optical disc 17 will be described.

As the optical disc 17, various types of optical discs may be used, for example, a DVD-RAM (Digital Versatile Disc—Random Access Memory), a DVD-R (DVD-Recordable), a DVD-RW (DVD ReWritable), a DVD+R (DVD+Recordable), a DVD+RW (DVD+ReWritable), a CD-R (Compact Disc—Recordable), a CD-RW (CD-ReWritable) or an MD (Mini Disc) (registered trademark).

Figure 3:
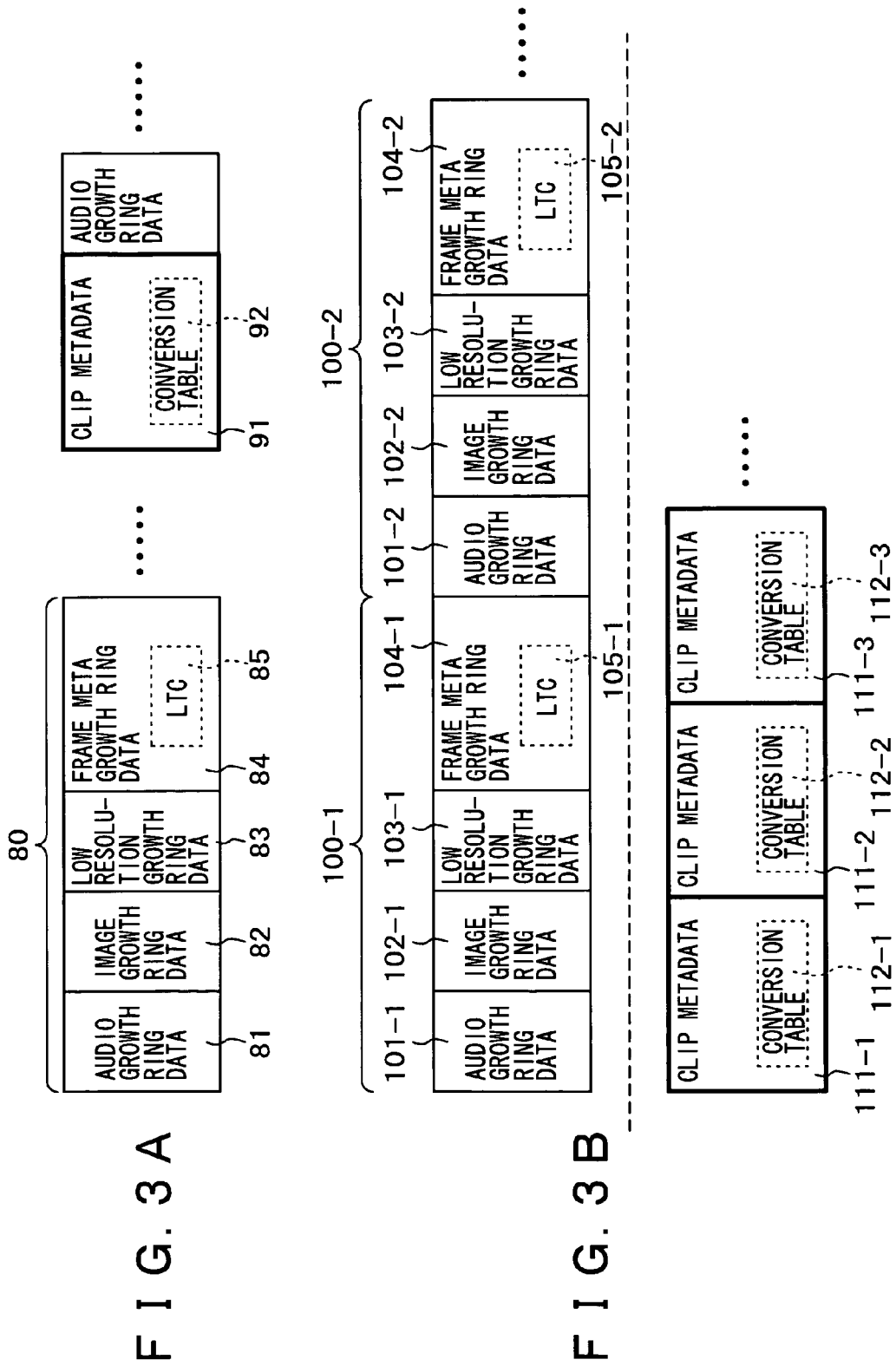
FIGS. 3A and 3B are schematic diagrams showing an example of the configuration of data recorded on an optical disc in FIG. 1.

As described above, a plurality of clip data including image data and audio data are written by the imaging apparatus 14 onto the optical disc 17 that is a recording medium, for example, as shown in FIG. 3A.

Referring to FIG. 3A, growth ring data 80 including audio growth ring data 81, image growth ring data 82, low resolution growth ring data 83, and frame meta growth ring data 84 obtained from the imaging apparatus 14 and corresponding to a predetermined time unit (for example, 2 seconds) is written on the optical disc 17 continuously by one clip. Following the last growth ring data 80, clip metadata 91 corresponding to the clip is written and, after that, growth ring data and clip metadata corresponding to other clips are written.

The audio growth ring data 81 and the image growth ring data 82 are data to be reproduced at the same time and corresponding to each other. That is, the audio growth ring data 81 is audio data corresponding to the moving image generated by reproducing the image growth ring data 82. The low resolution growth ring data 83 is data corresponding to the image growth ring data 82 and is data whose reproducing time is the same as that of the image growth ring data 82. That is, the low resolution growth ring data 83 corresponds to a small image-sized moving image generated by reducing the image size of the moving image generated by reproducing the image growth ring data 82. The frame meta growth ring data 84 is composed of metadata added to the frames (one screen of image data) corresponding to the image growth ring data 82 (hereinafter called frame metadata). That is, the frame meta growth ring data is composed of multiple frame metadata corresponding to all frames of the image growth ring data 82.

Frame metadata is data that corresponds to an added frame and that must be processed in real time (real time metadata) when the image signal is reproduced. That is, frame metadata is, for example, an LTC that is a time code characterizing the image signal corresponding to the frame using predetermined time information such as the date/time (year, month, day, hour, minute, second), user bit (UB: User Bit) indicating the signal characteristics of the image signal of the frame, UMID, GPS (Global Positioning System) information indicating the position where the image is imaged by a video camera, an essence mark that is information on the contents of essence data of the image signal or audio signal, ARIB (Association of Radio Industries and Businesses) metadata, and setting/control information on the video camera that imaged the image.

The ARIB metadata is metadata standardized by ARIB and used with the standard communication interface such as SDI (Serial Digital Interface). The setting/control information on the video camera is, for example, lens information on the iris control value, white balance/black balance mode, zooming of lens, and focus.

Therefore, the frame meta growth ring data 84 includes an LTC 85 that is frame time information using a time independent of the actual time (real time) or the real time based on a predetermined time. This LTC 85, which is the aggregate of LTCs added to the frames, includes LTCs corresponding to all frames of the image growth ring data 82 included in the same growth ring data 80. When the audio growth ring data 81 and the image growth ring data 82 are reproduced, the LTC is also reproduced with them.

Data is recorded on the optical disc 17 spirally or concentrically from the inner side to the outer side. Therefore, on the optical disc 17, the growth ring data 80 including the audio data 81 and the image data 82 corresponding to the same reproducing time and the corresponding low resolution data 83 and frame meta data 84, is recorded sequentially in the order in which imaged data is obtained, and the corresponding data is recorded (placed) in the physically-neighboring positions on the optical disc 17. In this way, the optical disc 17 can reduce the seek time at data reproducing (at read processing time) and reduce the processing time and the load required for the processing.

Following the multiple units of growth ring data 80 recorded by one clip, the clip metadata 91 is recorded.

The clip metadata 91, which is data corresponding to the all added clips, is data that need not be processed in real time at the image signal reproducing (hereinafter called non-real-time metadata). That is, the clip metadata includes, for example, a conversion table 92 that establishes the correspondence between the LTCs corresponding to the frames and frame numbers and, in addition, UMID, GPS information, and other information. The clip metadata 91, primarily used for editing and searching for audio data or image data, is usually composed of data that is not required at the reproducing of image data.

The frame metadata and the clip metadata may include data other than that described above. The frame metadata and the clip metadata may include the data of the same contents, the data of the frame metadata described above may be used as the clip metadata and, conversely, the data described above as the clip metadata may be used the frame metadata.

For example, the essence mark, ARIB metadata, or video camera setting/control information may be used as the clip metadata or may be included in both the frame metadata and the clip metadata. The UMID and the GPS information may be included in the frame metadata or may be included in both the frame metadata and the clip metadata.

Referring to FIG. 3A, the conversion table 92 included in the clip metadata 91 is a table corresponding to the LTCs included in the growth ring data from the first growth ring data or the growth ring data recorded after the immediately preceding clip metadata to the growth ring data recorded immediately before. Therefore, the conversion table 92 is recorded somewhat nearer (as compared with FIG. 3B that will be described later) to the audio growth ring data 81 and the image growth ring data 82 corresponding to the conversion table 92.

The metadata included in the clip metadata 91 is metadata that need not basically be processed in real time. However, when the user uses the conversion table 92 to instruct the reproducing of a particular frame, it is more advantageous to record the audio growth ring data 81 and the image growth ring data 82 to be reproduced near the conversion table 92 because the seek time can be reduced and the reading speed of the audio growth ring data 81 and the image growth ring data 82 can be increased.

The clip metadata may be collectively recorded in an area separate from the area in which growth ring data is stored as shown in FIG. 3B. Referring to FIG. 3B, in an area separate from the area in which the growth ring data 100-1 composed of the audio growth ring data 101-1, image growth ring data 102-1, low resolution growth ring data 103-1, and frame meta growth ring data 104-1 and the growth ring data 100-2 composed of the audio growth ring data 101-2, image growth ring data 102-2, low resolution growth ring data 103-2, and frame meta growth ring data 104-2 are recorded, the clip metadata, such as the clip metadata 111-1, clip metadata 111-2, and clip metadata 111-3, is recorded collectively.

Each of the clip metadata 111-1 to 111-3 includes one of conversion tables 112-1 to 112-3. The start point, change point, and end point of the LTCs included in the corresponding frame meta growth ring data (that is, a frame whose LTC values are discontinuous with the LTC values of the immediately preceding frame (or immediately following frame)) are registered with those conversion tables 112-1 to 112-3.

Not only the values described above but also the LTCs may be registered with the conversion tables 112-1 to 112-3 at a predetermined interval. As more LTCs are registered with the conversion table, the time required to calculate the frame number of a request frame becomes shorter at a frame search time. However, an increase in the conversion table data size may require a longer time in the whole search processing. Therefore, it is desirable that the LTCs used in the conversion table be selected so that the size of the conversion table is appropriate.

In this case, the clip metadata is recorded in an area separate from the growth ring data after the audio data recording task, image data recording task, low resolution data recording task, and frame metadata recording task are terminated.

Therefore, the conversion tables 112-1 to 112-3 included respectively in the clip metadata 111-1 to 111-3 are recorded near each other. Therefore, when a specific frame is searched for using a plurality of conversion tables, the seek time can be reduced and the intended frame can be searched for at high speed.

In addition, when reproducing audio data and image data, there is no unnecessary clip metadata for the reproducing between those data, and therefore the read time can be reduced and the reproducing processing can be performed quickly.

In addition, the clip metadata is composed of metadata that need not be processed in real time with no need for considering the seek time during normal processing. Therefore, the clip metadata may be arranged in any physical location in the storage area on the optical disc 17, for example, one unit of clip metadata may be distributed among a plurality of locations.

As described above, the LTCs are recorded as frame metadata in conjunction with the essence data composed of the audio data and the image data and, in addition, the conversion table composed of the LTC start point, change point, and end point is recorded as the clip metadata. Therefore, when editing data recorded on the optical disc 17 described above, the user can easily perform the editing processing based on the LTCs and, at the same time, search for an intended frame using the LTC and reproduce it.

Next, the file system for managing data recorded on the optical disc 17 and the directory structure and the files of the file system will be described.

Any file system may be used as a file system for managing data recorded on the optical disc 17, for example, UDF (Universal Disk Format) or ISO 9660 (International Organization for Standardization 9660) may be used. When a magnetic disk such as a hard disk is used instead of the optical disc 17, FAT (File Allocation Tables), NTFS (New Technology File System), HFS (Hierarchical File System), or UFS (Unix (registered trademark) File System) may be used as the file system. A special file system may also be used.

Figure 4:
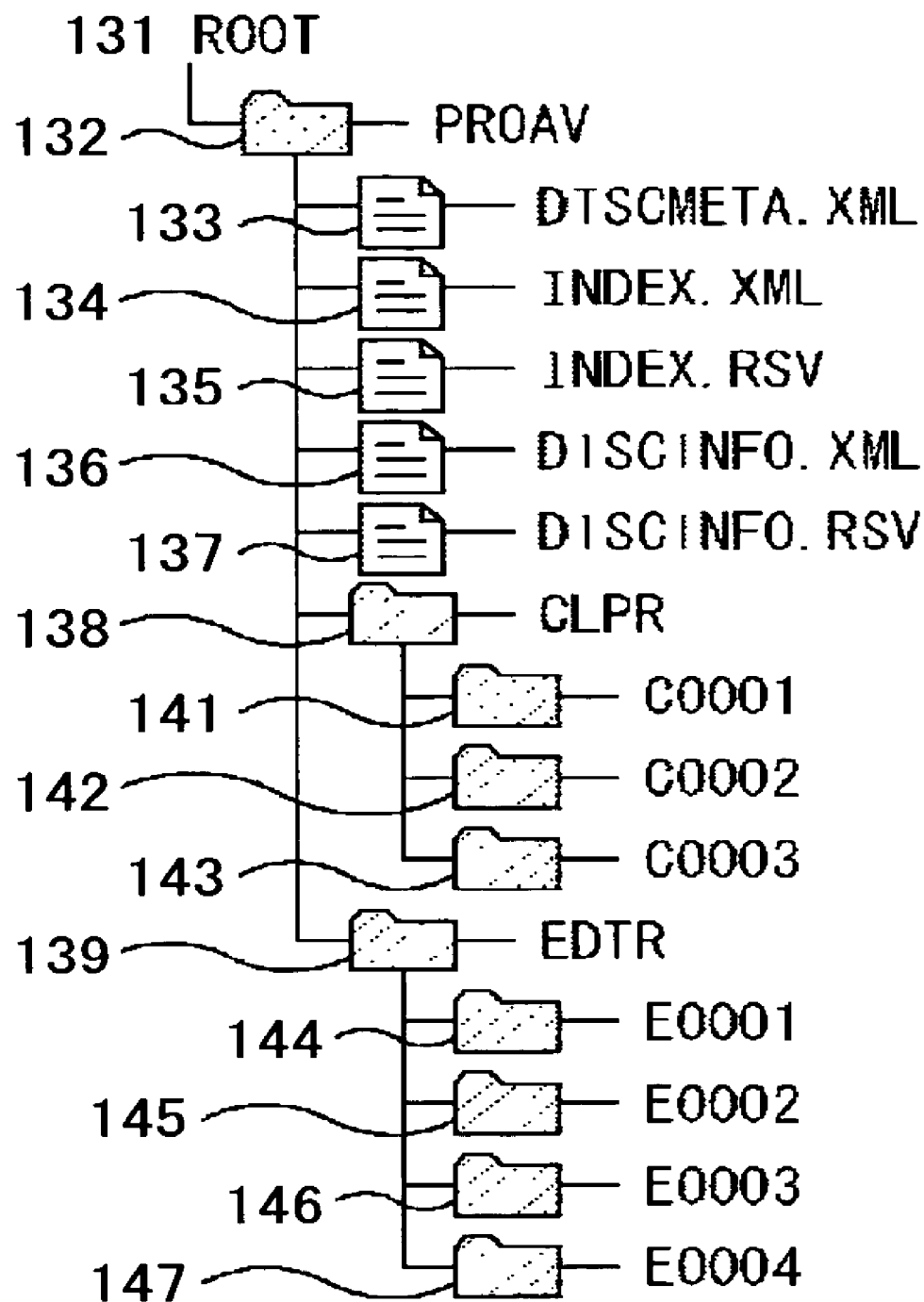
FIG. 4 is a diagram showing an example of a directory structure for managing data using a file system.

In this file system, the data recorded on the optical disc 17 is managed by the directory structure and the files such as those shown in FIG. 4.

In FIG. 4, the root directory (ROOT) 131 has the PROAV directory 132 which has lower-level directories in which information on essence data such as image data and audio data, and an edit list indicating the editing result of the essence data are stored. Although not shown, the configuration table data is also stored under the root directory 131.

The PROAV directory 132 has a disc meta file (DISC-META.XML) 133 that is a file containing the titles and comments for all essence data recorded on the optical disc 17 as well as information on the path to the image data corresponding to a representative image that is a representative frame for all image data recorded on the optical disc 17, an index file (INDEX.XML) 134 that includes management information for managing all clips and edit lists recorded on the optical disc 17, and an index file (INDEX.RSV) 135. The index file 135 is a copy of the index file 134, and the two files are prepared to increase reliability.

The PROAV directory 132 also has a disc information file (DISCINFO.XML) 136 that contains information on the metadata on the whole data recorded on the optical disc 17, for example, information on the disc attribute, reproducing start position, or Reclnhi, and a disc information file (DISKINFO.RSV) 137. The disc information file 137 is a copy of the disc information file 136, and the two files are prepared to increase reliability. To update the information, it is also possible to update only the disc information file 136.

In addition to the files described above, the PROAV directory 132 has a clip root directory (CLPR) 138 that has lower directories under which clip data is stored and an edit list root directory (EDTR) 139 that has lower directories under which edit list data is stored.

In the clip root directory 138, the data of the clips recorded on the optical disc 17 is managed in different directories according to the clips. For example, in FIG. 4, the data of three clips are managed in three directories, such as a clip directory (C0001) 141, a clip directory (C0002) 142, and a clip directory (C0003) 143.

That is, the data of the first clip recorded on the optical disc 17 is managed as the file under the directory of the clip directory 141, the data of the clip recorded for the second time on the optical disc 17 is managed as the file under the directory of the clip directory 142, and the data of the clip recorded for the third time on the optical disc 17 is managed as the file under the directory of the clip directory 143.

In the edit list root directory 139, the edit lists recorded on the optical disc 17 are managed in different directories according to the editing processing. For example, in FIG. 4, four edit lists are managed in four directories, such as an edit list directory (E0001) 144, an edit list directory (E0002) 145, an edit list directory (E0003) 146, and an edit list directory (E0004) 147.

That is, the edit list indicating the first editing result of the clip recorded on the optical disc 17 is managed as the file of the directory under the edit list directory 144, the edit list indicating the second editing result is managed as the file of the directory under the edit list directory 145, the edit list indicating the third editing result is managed as the file of the directory under the edit list directory 146, and the edit list indicating the fourth editing result is managed as the file of the directory under the edit list directory 147.

Figure 5:
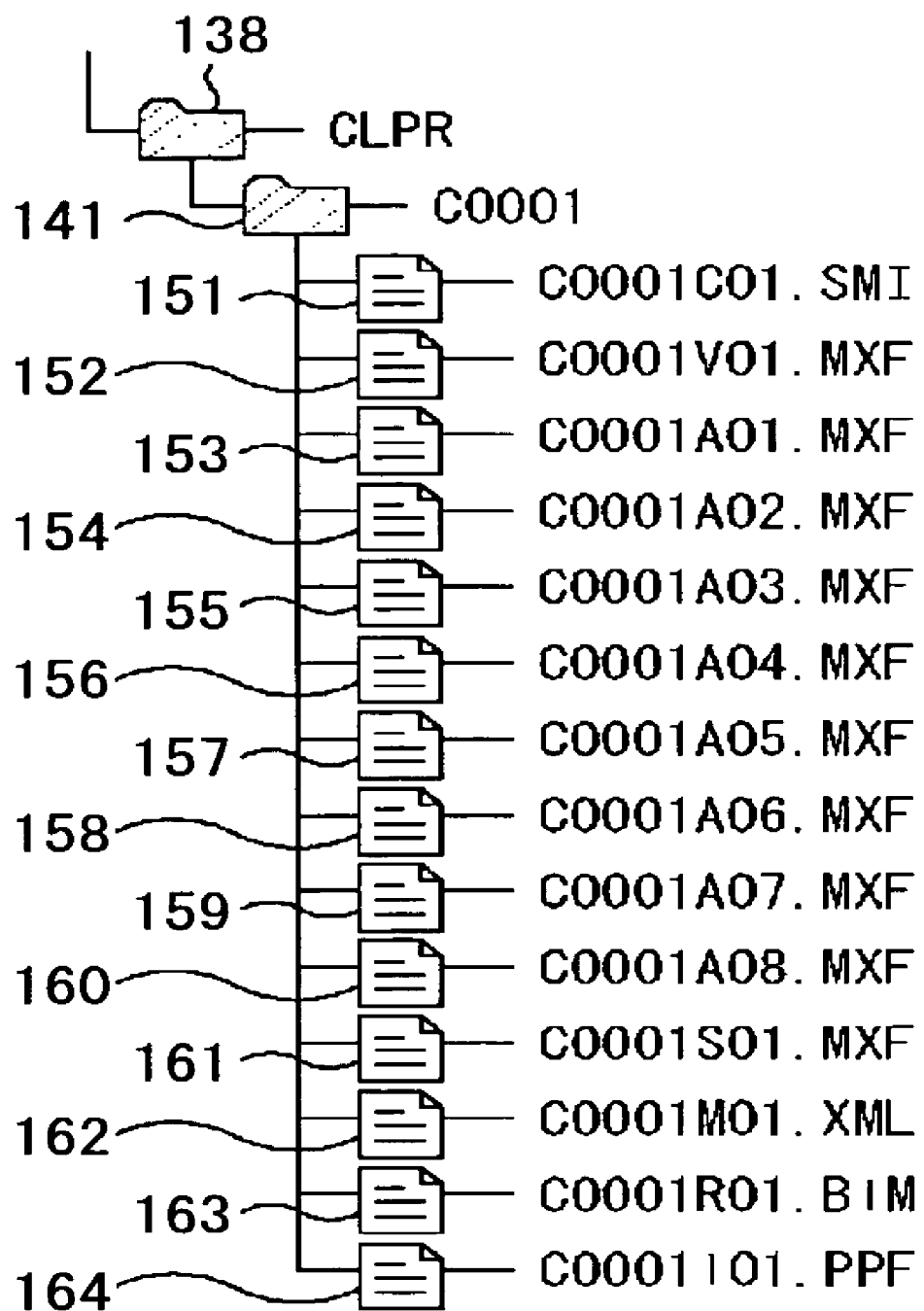
FIG. 5 is a diagram showing an example of the more detailed configuration of the directory structure shown in FIG. 4.

In the directory under the clip directory 141 provided in the clip root directory 138 described above, the data of the clip recorded first on the optical disc 17 is provided and managed as files such as those shown in FIG. 5.

Referring to FIG. 5, the following files are included in the clip directory 141, those are a clip information file (C0001C01.SMI) 151 that is a file for managing this clip, an image data file (C0001V01.MXF) 152 that is a file containing the image data of this clip, audio data files (C0001A01.MXF to C0001A08.MXF) 153 to 160 that are eight files containing the audio data of the channels of this clip respectively, a low resolution file (C0001S01.MXF) 161 that is a file containing the low resolution data corresponding to the image data of this clip, and a clip metadata file (C0001M01.XML) 162 that is a file containing clip metadata that corresponds to the essence data of this clip and that need not be processed in real time, for example, the conversion table establishing the correspondence between LTCs and frame numbers.

Also included in the clip directory 141 area frame metadata file (C0001R01.BIM) 163 corresponding to the essence data of this clip and including frame metadata that must be processed in real time such as LTCs and a picture pointer file (C0001I01.PPF) 164 in which the frame structure (for example, information on picture compression format in MPEG and information on offset addresses from the start of the file) of the image data file 152 is described.

Referring to FIG. 5, the image data, low resolution data, and frame metadata, which are data that must be processed in real time at reproducing time, are each managed as one file to prevent the read time from being increased.

The audio data must also be processed in real time when reproduced and, to realize the multi-channel processing of audio data such as 7.1 channels, eight channels are provided and each is managed as a separate file. That is, though the audio data is managed as eight files in the above description, the number of files is not limited to eight but seven or less or nine or more files may also be used for the audio data.

Similarly, the image data, low resolution data, and frame metadata may also be managed each as two or more files in some cases.

In FIG. 5, the clip metadata that need not be processed in real time is managed as a file different from frame metadata that must be processed in real time. This prevents metadata, which is not necessary during the normal reproducing of image data, from being read and thus reduces the processing time of reproducing processing and the load required for the processing.

The clip metadata file 162 is described in the XML (extensible Markup Language) format to increase versatility, while the frame metadata file 163 is BiM in which XML-coded data is encoded in the binary format to reduce the processing time of reproducing processing and the load required for the processing.

The BiM that is encoded in the binary format such as the frame metadata file (C0001R01.BIM) 163 will be described later with reference to FIG. 7 and the following figures.

The example of the configuration of the files in the clip directory 141 shown in FIG. 5 can be applied to all clip directories corresponding to the clips recorded on the optical disc 17. That is, the example of the configuration of the files shown in FIG. 5 can be also applied to the other clip directories 142 and 143 shown in FIG. 4 and therefore its description is omitted.

The files included in the clip directories corresponding to one clip are as described above. The configuration of the files is not limited to the one described above. Any configuration may be used as long as the clip metadata files corresponding to a clip are in the directories under each clip directory.

Next, an example of the configuration of the files in the directories under the edit list root directory 139 in FIG. 4 will be described. In the directories under the edit list directory 145 included in the edit list root directory 139 described above, the data of the edit list, which is information on the second editing result of the data of the clips recorded on the optical disc 17, is provided and managed as the files such as those shown in FIG. 6.

Figure 6:
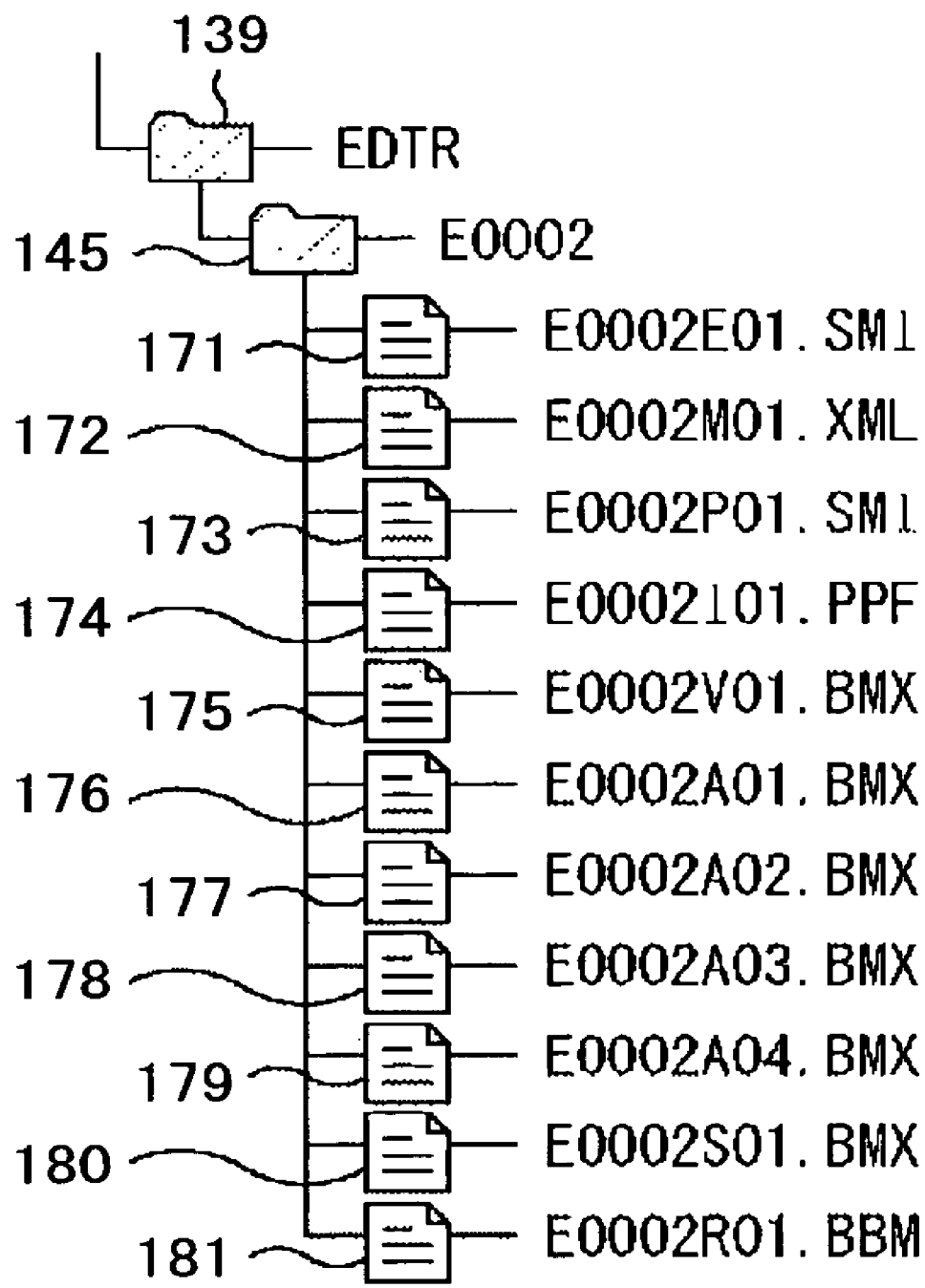
FIG. 6 is a diagram showing an example of the more detained configuration of the directory structure shown in FIG. 4.

Referring to FIG. 6, the edit list directory 145 includes an edit list file (E0002E01.SMI) 171 that is a file for managing the edit result (edit list), a clip metadata file (E0002M01.XML) 172 for the edit list that is a file including clip data corresponding to the edited essence data (portion of data extracted, as edited data, from the essence data of all clips used in the editing) or clip metadata newly generated based on the clip metadata, a play list file (E0002P01.SMI) 173 that is a file including information on the reproducing procedure (play list) for the essence data based on the editing result (edit list), and a picture pointer file (C0001101.PPF) 174 for the play list that is a file in which the frame structure of the image data generated based on the reproducing procedure included in the play list file 173 (for example, information on the compression format for each picture in MPEG or information on the offset addresses from the start of the file) is described.

The edit list directory 145 also includes an image data file (E0002V01.BMX) 175 for the play list that is a file including the image data for securing the real time reproducing based on the reproducing procedure (play list) for the play list file 173, audio data files (E0002A01.BMX to E0002A04.BMX) 176 to 179 for the play list that are four files including the audio data for securing the real time reproducing based on the reproducing procedure (play list) for the play list file 173, a low resolution data file (E0002S01.BMX) 180 for the play list that is a file including the low resolution data for securing the real time reproducing based on the reproducing procedure (play list) for the play list file 173, and a frame metadata file (E0002R01.BBM) 181 for the play list that is a file including the frame metadata for securing the real time reproducing based on the reproducing procedure (play list) for the play list file 173.

In FIG. 6, the clip metadata that need not be processed in real time is managed as a file different from that of the frame metadata that must be processed in real time. This prevents unnecessary metadata from being read while the image data is reproduced (during the reproducing of the edited result) using the reproducing procedure (play list) and thus reduces the processing time of the reproducing processing and the load required for the processing.

The clip metadata file 172 for the edit list is a file including new clip metadata generated based on the clip metadata of the clip used for editing (clip metadata file in the directory under the clip root directory 138) based on the editing result. For example, when editing is performed, the portion corresponding to the edited essence data is extracted from the clip metadata included in the clip metadata file 162 in FIG. 5, and new clip metadata is reconfigured, with the edited essence data as one clip, using the extracted metadata and managed as the clip metadata file for the edit list.

That is, new clip metadata is added to the edited essence data with the edited essence data as one clip, and the clip metadata is managed as a clip metadata file for one edit list. Therefore, this clip metadata file for the edit list is generated each time editing is performed.

This clip metadata file 172 for the edit list is described in the XML format to ensure versatility.

The image data included in the image data file 175 for the play list, the audio data included in the audio data files 176 to 179 for the play list, the low resolution data included in the low resolution data file 180 for the play list, and the frame metadata included in the frame metadata file 181 for the play list are data extracted respectively from the image data, audio data, low resolution data, and frame metadata corresponding to the clips managed in the directories under the clip root directory 138 in FIG. 5 and are data corresponding to the editing result.

These data are read when reproducing processing is performed based on the reproducing procedure (play list) included in the play list file 173. Preparing the data corresponding to the editing result reduces the number of files that are read during the reproducing processing based on the play list and reduces the processing time and the load required for the processing.

In some cases, the image data, low resolution data, and frame metadata may be managed each as multiple files. Similarly, the number of files corresponding to the audio data may be three or less or five or more.

The frame metadata file 181 for the play list is a BBM format file corresponding to the BIM format generated by compiling the XML format file in order to reduce the processing time of the reproducing processing and the load required for the processing.

The example of the configuration of the files in the edit list directory 145 shown in FIG. 6 can be applied to all edit lists (editing results). That is, the example of the configuration of the files shown in FIG. 6 can be applied also to the other edit list directories 144, 146 or 147 shown in FIG. 4 and therefore the description is omitted.

The files included in the edit list directory corresponding to one editing work have been described above. The configuration of the files is not limited to the one described above. Any configuration may be used as long as the clip metadata file for the edit list corresponding to the editing is included in the directory under the edit list directory.

Next, the data included in the clip metadata will be described. As described above, the clip metadata includes the conversion table for conversion between LTCs and frame numbers, UMID, GPS information, and other information. Because this information is standardized information that may be stored in the frame metadata and is sometimes required to be processed in real time, the information is represented as KLV (Key Length Value) encoded data (hereinafter called KLV data), composed of key data, length data, and value data, in order to secure synchronous communication using the standard interface such as SDI (Serial Digital Interface). This format conforms to SMPTE 336M.

The key data of KLV data is an identifier indicating a KLV encoded data item. Identifiers defined in the SMTPE metadata dictionary and corresponding various data items are used for this identifier. The length data of KLV data is data indicating the length of the value data in bytes. The value data of KLV data is data composed of data itself such as text data as in an XML document. That is, KLV data is the encoded data of a data item indicated by the key data, whose length is indicated by the length data, and which is data indicated by the value data.

Although the conversion table and UMID are also one of KLV data in practice as described above, the metadata included in the clip metadata other than the conversion table and UMID are called KLV data in the description below for the sake of simplicity.

The encoding method described above is an example of the encoding method, and the information included in the clip metadata may be encoded in a method other than the KLV encoding method or may not encoded.

Next, BiM that is compressed in the binary format as with the frame metadata file (C0001R01.BIM) 163 shown in FIG. 5 will be described. The BiM encoder is required to compress XML-coded metadata to generate BiM, and the BiM decoder is required to decode BiM to interpret the contents. The editing terminal apparatus 16 has the BiM encoder and the BiM decoder built in the clip data editing unit 54.

The BiM encoder has the schema definition document in which the description method for metadata, from which BIM is generated, is defined. The BiM decoder also has the schema definition document, in which the description method for metadata from which BIM is generated, is defined. When the BiM encoder and the BiM decoder have the common schema definition document, BiM generated by the BiM encoder can be completely interpreted by the BiM decoder. In other words, when the BiM encoder generates BiM based on a non-standard, unique schema definition document and the BiM decoder has only the standard schema definition document, the BiM decoder interprets only the standard part included in BiM.

FIG. 7 shows an example of standard XML-coded real-time metadata before being encoded by the BiM encoder into BiM. This standard real-time metadata is composed of the Wrapper, which is composed of the standard name space identifier (in this example, "urn:schemas-proDisc:realTimeMeta") that is the Root (first row), UMID (second row), and ECC alignment Filler (third row), and the description corresponding to each frame. The description corresponding to each frame is composed of the required items, which include byte alignment Bitfiller (fifth row), LTC (sixth row) UMID (seventh row) and KLV (eighth row), and the length-adjusting Filler (ninth row) for the fragment update unit (FUU) in BiM.

This standard real-time metadata before being encoded into BiM is characterized in that fillers are provided for ECC alignment, byte alignment, and FUU length adjustment. In particular, the metadata is characterized in that Bitfiller is provided to byte-align the boundary of required items, including the LTC, UMID, and KLV, in the encoded BiM.

Next, FIG. 8 shows an example of non-standard XML-coded real-time metadata before being encoded by the BiM encoder into BiM, that is, an example of extended real-time metadata including the standard items as well as items uniquely added by a manufacturer (for example, video camera setting/control information, ARIB metadata, and so on) (hereinafter called unique item). This non-standard real-time metadata is composed of the Wrapper, which is composed of the non-standard name space identifier ("urn:schemas-proDisc:realTimeMeta:cameraMeta" in this example) that is the Root (first row), UMID (second row), and ECC alignment Filler (third row), and the description corresponding to each frame.

The description corresponding to each frame is composed of the required items, which include byte alignment Bitfiller corresponding to each frame (fifth row), LTC (sixth row), UMID (seventh row), and KLV (eighth row), the unique items (ninth to seventeenth row) composed of video camera setting/control information, and the length-adjusting Filler (nineteenth row) for the fragment update unit (FUU) in BiM.

This non-standard real-time metadata before being encoded into BiM is also characterized in that fillers are provided for ECC alignment, byte alignment, and FUU length adjustment. In particular, the metadata is characterized in that Bitfiller is provided to byte-align the boundary of required items, including the LTC, UMID, and KLV, in the encoded BiM.

This non-standard real-time metadata, in which ARIB metadata and so on are described as unique items, is also described as in FIG. 8.

Next, the generation processing of BiM of standard real-time metadata, such as the one shown in FIG. 7, will be described with reference to the flowchart in FIG. 9. The clip data editing unit 54 describes a name space identifier (in this example, "urn:schemas-proDisc:realTimeMeta"), defined in the standard schema, in the Wrapper in step S1 and describes the UMID and the ECC alignment Filler in step S2. In step S3, the clip data editing unit 54 describes the byte alignment Bitfiller at the start of data corresponding to each frame and, after that, describes the required items including the LTC, UMID, and KLV. In step S4, the clip data editing unit 54 adds the length adjusting Filler for the fragment update unit in BiM to the end of the required items, describes the standard real-time metadata and, in step S5, compresses the metadata into the binary format using the built-in BiM encoder to generate the standard BiM.

Figure 10:
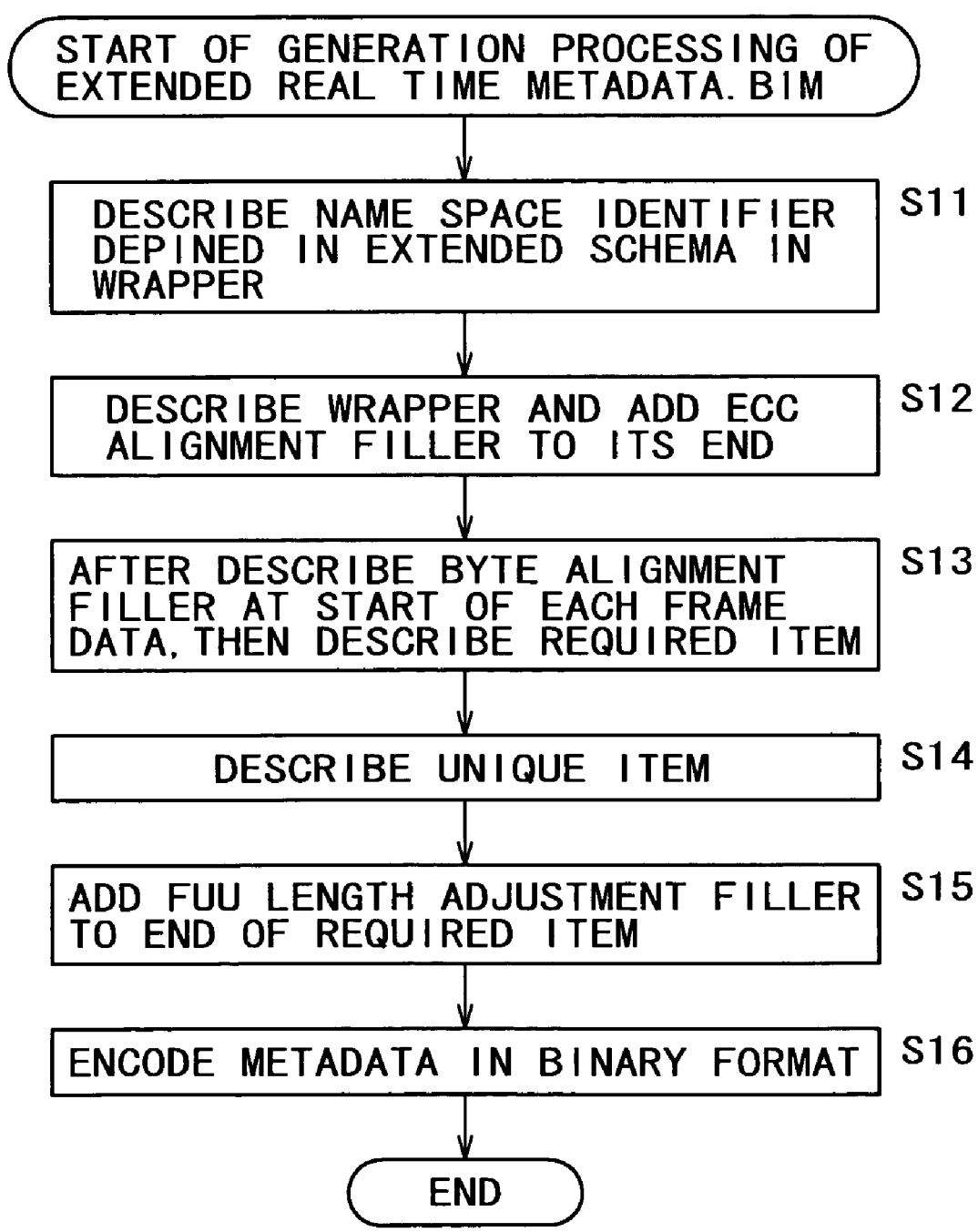
FIG. 10 is a flowchart showing processing for describing non-standard real time metadata before being encoded into BiM.
Figure 11:
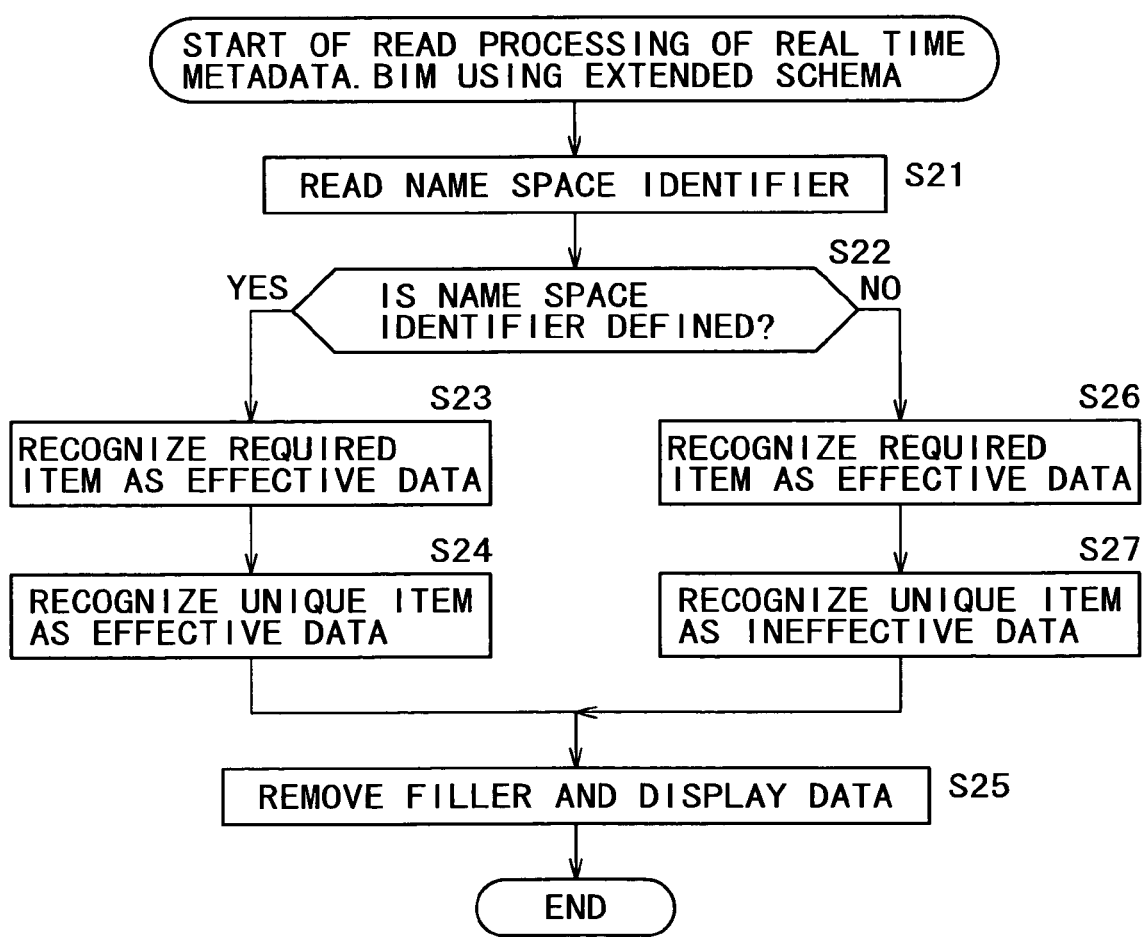
FIG. 11 is a flowchart showing the read processing of BiM using a unique schema.

Next, the generation processing of BiM of non-standard real-time metadata, such as the one shown in FIG. 8, will be described with reference to the flowchart in FIG. 10. The clip data editing unit 54 describes a name space identifier (in this example, "urn:schemas-proDisc:realTimeMeta:cameraMeta"), defined in the manufacturer's unique non-standard schema in advance, in the Wrapper in step S11 and describes the UMID and the ECC alignment Filler in step S12. In step S13, the clip data editing unit 54 describes the byte alignment Bitfiller at the start of data corresponding to each frame and, after that, describes the required items including the LTC, UMID, and KLV. In step S14, the clip data editing unit 54 describes the unique items (in this example, video camera setting/control information). In step S15, the clip data editing unit 54 adds the length adjusting Filler for the fragment update unit in BiM to the end of the unique items, describes the non-standard real-time metadata and, in step S16, compresses the metadata into the binary format using the built-in BiM encoder to generate the non-standard BiM.

As described above, the boundary of the required items including the LTC, UMID, and KLV in BiM is byte-aligned when real-time metadata is encoded in the binary format and BiM is generated. Therefore, when BiM generated in this way is read, the position in which the required items are described can be found quickly. Therefore, as compared with a case in which the boundary of the required items is not byte-aligned, the time required for reading BiM can be reduced and the amount of resources to be used can be reduced.

In the above description, real-time metadata is once described in XML and, after that, converted to the binary format using the BiM encoder. It is also possible to omit the description of metadata in XML and to directly output BiM data by acquiring the schema-based binary format in advance.

Next, the processing in which the BiM of real-time metadata is read at the same time the clip data is reproduced will be described. In step S21, the clip data editing unit 54 reads the name space identifier described in the Wrapper of BiM by using the built-in BiM decoder and checks if the name space identifier that is read is already defined in its own schema in step S22. If it is found that the identifier is already defined in its own schema, the processing goes to step S23.

The clip data editing unit 54 recognizes the required items included in BiM as effective data in step S23 and, in addition, recognizes the unique items as effective data in step S24. In step S25, the clip data editing unit 54 removes Filler from BiM and then uses the data recognized as effective (in this example, required item and unique item data) in the editing processing. This allows the data, recognized as effective, to be displayed on the screen.

On the other hand, if the name space identifier that is read is, for example, "urn:schemas-proDisc:realTimeMeta:cameraMeta" and its own schema is standard in step S22, the name space identifier that is read is judged as the one not defined in its own schema and the processing goes to step S26.

The clip data editing unit 54 recognizes the required items included in BiM as effective data in step S26 and recognizes the unique items as ineffective data, that is, as data not recognizable by the editing unit (more specifically, recognized as filler not having significant meaning) in step S27. The clip data editing unit 54 removes Filler from BiM in step S25 and, after that, uses the data recognized as effective (only data of the required items in this example) in the editing processing. This allows the data, recognized as effective, to be displayed on the screen. At this time, the unique items, which are recognized as ineffective data (that is, Filler), are not displayed on the screen. In this case, the method prevents the presence of the data of the unique items of a manufacturer from being recognized by the apparatus of some other manufacturer and therefore preserves the secret of the unique items and prevents the data of the unique items from being analyzed.

Conversely, to allow the presence of the data of unique items, recognized as ineffective, to be discovered, some character string (for example, a sequence of 0s) may be displayed.

For example, when real-time metadata not encoded in BiM is read at the same time clip data is reproduced, the same processing can also be performed to read only data recognizable by, but not data unrecognizable, by the editing unit. However, at present, there is no real-time metadata that is not encoded in BiM.

The method for processing real-time metadata using the BiM encoder has been described. For example, if the schema is designed such that the byte offset from the specified position of the required items in BiM-technology-based data is constant regardless of whether the schema is standard or non-standard, it is also possible to directly read required items without using the BiM decoder.

Next, how the clip data editing unit 54 handles non-real-time metadata will be described. As described above, the conversion table 92, UMID, GPS information, and other information are described in the clip metadata 91, which is one type of non-real-time metadata, using XML.

As with real-time metadata described above, non-real-time metadata can also include the data of the required items recorded as standard items as well as data unique to a manufacturer. This is described in the name space defined in the manufacturer's unique schema defined in advance.

Figure 12:
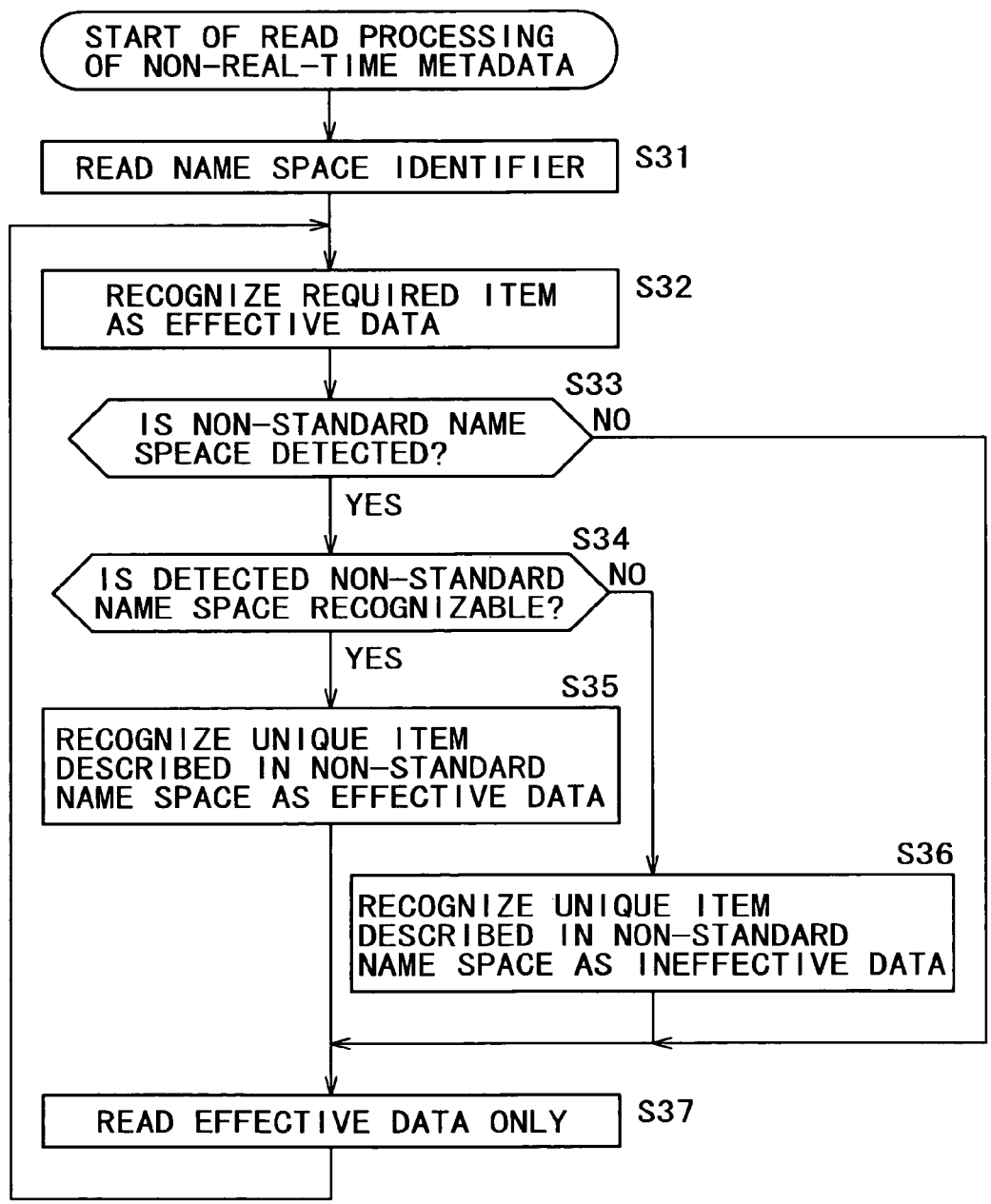
FIG. 12 is a flowchart showing the read processing of non-real-time metadata including unique items.

Next, the read processing of non-real-time metadata including unique items, which are used in the clip data editing processing, will be described with reference to the flowchart in FIG. 12.

The clip data editing unit 54 reads the name space identifier of non-real-time metadata in step S31 and recognizes the required items, which are included in the non-real-time metadata and described in the standard name space, as effective data in step S32.

The clip data editing unit 54 checks if a non-standard name space (that is, non-standard name space unique to a manufacturer) is detected in step S33. If it is found that a nonstandard name space is detected, the clip data editing unit 54 checks if the detected non-standard name space is recognizable in step S34. If it is found that the detected non-standard name space is recognizable, the processing goes to step S35. In step S35, the clip data editing unit 54 recognizes the unique items, described in the non-standard name space, as effective data.

Conversely, if it is found that the detected non-standard name space is not recognizable in step S34, the processing goes to step S36. In step S36, the clip data editing unit 54 recognizes the unique items, described in the non-standard name space, as ineffective data.

In step S37, the clip data editing unit 54 reads the data, recognized as effective, and skips the data recognized as ineffective. The data that is read is used in the clip data editing processing. After that, the processing returns to step S32 and the subsequent processing is repeated.

If it is found that a non-standard name space is not detected in step S33, the processing from steps S34 to S36 is skipped and the processing goes to step S37.

As described above, when non-real-time metadata is read for use in the clip data editing processing, the data of only the unique items defined in the schema and identified by the editing unit is read but the data of the unique items not defined in the schema, for example, the data of the unique items of some other manufacturer is not read but ignored. Therefore, the non-real-time metadata that is read can be used efficiently.

Figure 13:
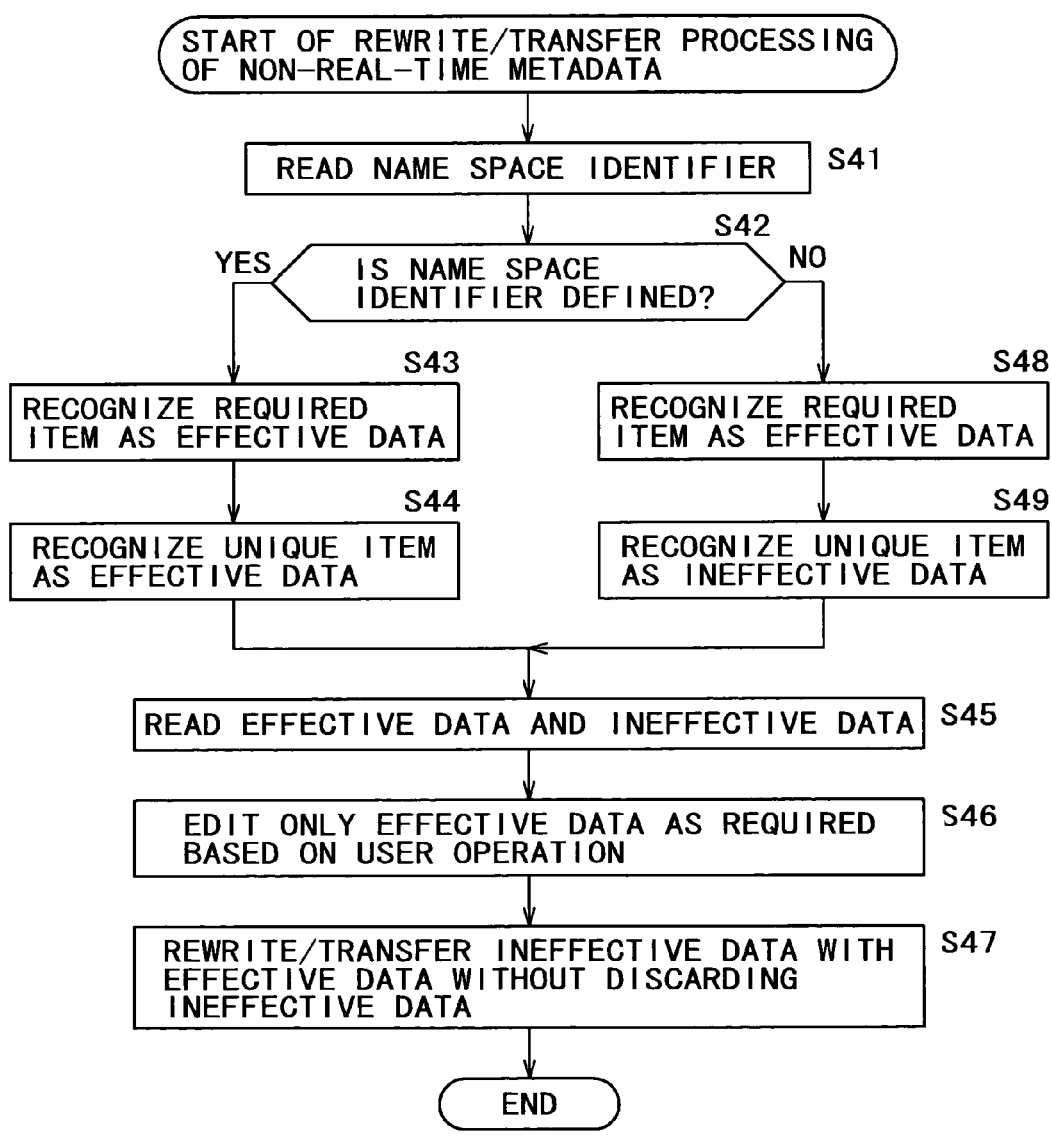
FIG. 13 is a flowchart showing the rewrite/transfer processing of non-real-time metadata including unique items.

Next, the processing in which non-real-time metadata itself, including unique items, is edited and rewritten on the optical disc 17 or transferred to another apparatus will be described with reference to the flowchart in FIG. 13.

The clip data editing unit 54 reads the name space identifier of the unique items in the non-real-time metadata in step S41 and checks if the name space identifier that is read is defined in its own schema in step S42. If it is found that the name space identifier that is read is defined in its own schema, the processing goes to step S43.

A clip data editing unit 44 recognizes the required items included in the non-real-time metadata as effective data in step S43 and, in addition, recognizes the unique items as effective data in step S44. In step S45, the clip data editing unit 54 reads the data recognized as effective (in this example, data of both required items and unique items) and data recognized as ineffective. In step S46, the clip data editing unit 44 edits only the data, which is read and recognized as effective, as necessary, for example, in response to a user operation. The processing of step S46 may be omitted.

The clip data editing unit 44 does not discard the data, which is read in step S45 and is recognized as ineffective, but rewrites the data on the optical disc 17 or transfers the data to another apparatus in step S47 with the data, recognized as effective, that is edited as necessary in step S46.

Conversely, if it is found that the name space identifier that is read is not defined in its own schema in step S42, the processing goes to step S48. The clip data editing unit 54 recognizes the required items included in the non-real-time metadata as effective data in step S48 and recognizes the unique items as ineffective data in step S49. In step S45, the clip data editing unit 54 reads the data recognized as effective (in this example, required item data) and the data recognized as ineffective (in this example, unique item data). After that, the processing of step S45 and the following steps is performed as described above.

As described above, when non-real-time metadata itself is edited, the data of unique items not defined in the schema, for example, the data of the unique items of some other manufacturer, is not edited. In addition, when the data is rewritten or transferred, the data not defined in the schema, for example, the data of unique items of some other manufacturer is rewritten or transferred with the data of the required items or with the data of unique items defined in the schema and identified. Therefore, the data of unique items not identified by the editing unit can be protected without deleting or changing the information.

The recording of data such as image data, audio data, low resolution data, frame metadata, clip metadata, and edit lists onto an optical disc is described above. The recording medium for recording the data is not limited to an optical disc. For example, the data may be written on a magnetic disk such as a flexible disk or a hard disk, a magnetic tape, or a semiconductor memory such as a flash memory.

In the above description, editing is performed on the editing terminal apparatus 16. However, the information processing apparatus on which editing is performed is not limited to this apparatus. For example, the apparatus may be the planning terminal apparatus 11, imaging apparatus 14, or field PC 15 in FIG. 1 or may be some other information processing apparatus.

The sequence of processing described above may be executed by hardware or by software as described above. When the sequence of processing is executed by software, the software is installed from a recording medium to a computer in which the programs constituting the software are built in special hardware or to a computer, such as a general-purpose personal computer, that can execute various functions by installing various programs therein.

The recording medium is configured not only by the removable medium 71, provided separately from the editing terminal apparatus 16 as shown in FIG. 2, that includes a package medium, for example, a package medium such as a magnetic disk (including a flexible disk), an optical disc (including a CD-ROM, DVD, magneto-optical disk, and MD), or a semiconductor memory which is distributed to the user to provide the user with a program and on which a program is recorded but also by a device which is built in the computer when provided to the user and in which the program is stored, such as the ROM 52 or a hard disk in which the storage unit 63 is included.

In this specification, the steps describing the program provided by a medium includes processing executed on a time-series basis according to the described sequence as well as processing executed not always on a time-series basis but in parallel or individually.

In this specification, the system refers to the whole apparatus comprising a plurality of apparatuses.

What is claimed is:

1. An information processing apparatus for reproducing metadata including information on material data in a storage medium, said information processing apparatus comprising:
a processor; and
a memory to store instructions which, when executed by the processor, causes the processor to control:
determination means for determining whether metadata includes standard name space or non-standard name space, the standard name space being name space that is defined in advance;
clip data editing means for detecting whether a non-standard name space determined by the determination means is recognizable, and if a detected non-standard name space is recognizable, then clip data editing means recognizes the unique items, described in the non-standard name space, as effective data, and if a detected non-standard name space is not recognizable, then the clip data editing means recognizes the unique items, described in the non-standard name space, as ineffective data, wherein the editing means reads the data, recognized as effective, and skips the data recognized as ineffective, and edits only the effective data, wherein the effective data and the ineffective data are items that compose a description corresponding to each frame;
reproducing means for reproducing the ineffective data with the edited effective data, wherein said reproducing means to read data from, or write data to a removable non-transitory storage medium; and
control means for transferring the ineffective data with the edited effective data.

2. The information processing apparatus as claimed in claim 1, wherein said metadata is described using XML (extensible markup language).

3. The information processing apparatus as claimed in claim 1,
wherein said determination means determines whether an item included in the metadata is the standard name space defined in advance based on whether a name space identifier described in the metadata is defined in a schema owned by said information processing apparatus.

4. The information processing apparatus as claimed in claim 1, wherein said metadata is non-real-time metadata that is not required to be read at the same time with the reproduction of the material data.

5. An information processing method for reproducing metadata including information on material data in a storage medium, said information processing method comprising:
a determination step, performed by a processor, for determining whether metadata includes standard name space or non-standard name space, the standard name space being name space that is defined in advance;
an editing step for checking whether a non-standard name space determined by the determination step is recognizable, and if a detected non-standard name space is recognizable, then editing step recognizes the unique items, described in the non-standard name space, as effective data, and if a detected non-standard name space is not recognizable, then the editing step recognizes the unique items, described in the non-standard name space, as ineffective data, wherein the editing step reads the data, recognized as effective, and skips the data recognized as ineffective, and edits only the effective data, wherein the effective data and the ineffective data are items that compose a description corresponding to each frame;
a reproducing step for reproducing the ineffective data with the edited effective data, wherein said reproducing step reads data from, or writes data to a removable non-transitory medium; and
a control step for transferring the ineffective data with the edited effective data.

6. A non-transitory recording medium for storing a program that when executed causes a computer to reproduce metadata including information on material data, by a method executed by said program comprising:
a determination step, performed by a processor, for determining whether metadata includes standard name space or non-standard name space, the standard name space being name space that is defined in advance;
an editing step for checking whether a non-standard name space determined by the determination step is recognizable, and if a detected non-standard name space is recognizable, then editing step recognizes the unique items, described in the non-standard name space, as effective data, and if a detected non-standard name space is not recognizable, then the editing step recognizes the unique items, described in the non-standard name space, as ineffective data, wherein the editing step reads the data, recognized as effective, and skips the data recognized as ineffective, and edits only the effective data, wherein the effective data and the ineffective data are items that compose a description corresponding to each frame;

a reproducing step for reproducing the ineffective data with the edited effective data, wherein said reproducing step reads data from, or writes data to a removable non-transitory medium; and a control step for transferring the ineffective data with the edited effective data.

7. A program recorded on a non-transitory recording medium for reproducing metadata including information on material data, causing a processor to perform a method executed by said program comprising:

a determination step, performed by the processor, for determining whether metadata includes standard name space or non-standard name space, the standard name space being name space that is defined in advance;

an editing step for checking whether a non-standard name space determined by the determination step is recognizable, and if a detected non-standard name space is recognizable, then editing step recognizes the unique items, described in the non-standard name space, as effective data, and if a detected non-standard name space is not recognizable, then the editing step recognizes the unique items, described in the non-standard name space, as ineffective data, wherein the editing step reads the data, recognized as effective, and skips the data recognized as ineffective, and edits only the effective data, wherein the effective data and the ineffective data are items that compose a description corresponding to each frame;

a reproducing step for reproducing the ineffective data with the edited effective data, wherein said reproducing step reads data from, or writes data to a removable non-transitory medium; and a control step for transferring the ineffective data with the edited effective data.

* * * * *